United States Patent
Ting (10) Patent No.: US 11,405,675 B1
(45) Date of Patent: Aug. 2, 2022

(54) INFRARED REMOTE CONTROL AUDIOVISUAL DEVICE AND PLAYBACK METHOD THEREOF

(71) Applicants: Inventec (Pudong) Technology Corporation, Shanghai (CN); INVENTEC CORPORATION, Taipei (TW)

(72) Inventor: Kuo-Chi Ting, Taipei (TW)

(73) Assignees: INVENTEC (PUDONG) TECHNOLOGY CORPORATION, Shanghai (CN); INVENTEC CORPORATION, Taipei (TW)

(*) Notice: Subject to any disclaimer, the term of this patent is extended or adjusted under 35 U.S.C. 154(b) by 0 days.

(21) Appl. No.: 17/548,711

(22) Filed: Dec. 13, 2021

(30) Foreign Application Priority Data

Sep. 14, 2021 (CN) .......................... 202111074488.9

(51) Int. Cl.
 *H04N 21/41* (2011.01)
 *H04N 21/434* (2011.01)
 *H04N 21/233* (2011.01)

(52) U.S. Cl.
 CPC ..... *H04N 21/41265* (2020.08); *H04N 21/233* (2013.01); *H04N 21/4345* (2013.01)

(58) Field of Classification Search
 CPC ........... H04N 21/41265; H04N 21/233; H04N 21/4345
 See application file for complete search history.

(56) References Cited

U.S. PATENT DOCUMENTS

| | | | | |
|---|---|---|---|---|
| 10,872,115 | B2* | 12/2020 | Agrawal | G06F 16/5866 |
| 2005/0042591 | A1* | 2/2005 | Bloom | G11B 27/34 |
| | | | | 434/308 |
| 2014/0362290 | A1* | 12/2014 | Bridges | G11B 27/34 |
| | | | | 348/484 |
| 2021/0344974 | A1* | 11/2021 | Yu | H04N 21/440236 |

* cited by examiner

*Primary Examiner* — Oschta I Montoya
(74) *Attorney, Agent, or Firm* — Locke Lord LLP; Tim Tingkang Xia, Esq.

(57) ABSTRACT

A playback method of infrared remote control audiovisual device comprises: utilizing a display interface and an audio output interface to output frames and an audio signal of a video; utilizing an infrared sensor to receive a first indication signal; pausing a playback of the display interface and an output of the audio output interface according to the first indication signal, so that the display interface displays a paused frame; utilizing the infrared sensor to receive a second indication signal; determining a target character pattern of a target block in the paused frame according to the second indication signal; extracting a determined audio track corresponding to the target character pattern from the audio signal according to a relation between the pre-processed character feature sets and pre-processed audio tracks; controlling the display interface to resume the playback and controlling the audio output interface to output the determined audio track.

8 Claims, 6 Drawing Sheets

INFRARED REMOTE CONTROL AUDIOVISUAL DEVICE AND PLAYBACK METHOD THEREOF

CROSS-REFERENCE TO RELATED APPLICATIONS

This non-provisional application claims priority under 35 U.S.C. § 119(a) on Patent Application No(s). 202111074488.9 filed in China on Sep. 14, 2021, the entire contents of which are hereby incorporated by reference.

BACKGROUND

1. Technical Field

This disclosure relates to a control method of video playback, and more particularly to an infrared remote control audio and video playback method.

2. Related Art

The conventional TV has to connect to the digital TV antenna, the HDMI cable or cable TV in order to display scheduled TV programs. Recently, with the development of smart home appliances, all home appliances, including TVs, are demanded to be able to connect to Internet or applications (APPs) etc. Like smart phones, smart TVs are provided with the functions of watching videos via internet-connection to platforms such as Youtube, Netflix, Apple TV+, myVideo, etc. However, when the TV plays the video, the audio signals are also played along, making the user have difficulty distinguishing to which character in the image the audio signal belongs.

SUMMARY

In light of the foregoing description, this disclosure provides an infrared remote control audiovisual device and playback method thereof to provide the audio signal of the specific character.

According to one or more embodiment of an infrared remote control audiovisual device, the infrared remote control audiovisual device includes an infrared sensor, a display interface, an audio output interface, a memory and a processor. The processor is connected to the infrared sensor, the display interface, the audio output interface, the memory and the processor. The infrared sensor is arranged to receive a first indication signal and a second indication signal. The display interface is arranged to display a plurality of frames of a video. The audio output interface is arranged to output an audio signal of the video. The memory stores a plurality of pre-processed character feature sets, a plurality of pre-processed audio tracks, and a relation between the plurality of pre-processed character feature sets and the plurality of pre-processed audio tracks. The processor is arranged to perform following steps: pausing a playback of the display interface and an output of the audio output interface according to the first indication signal, so that the display interface displays a paused frame; determining a target character pattern of a target block in the paused frame according to the second indication signal, wherein the second indication signal indicates the target block, and the target character pattern corresponds to one of the plurality of pre-processed character feature sets; extracting a determined audio track corresponding to the target character pattern from the audio signal according to the relation between the plurality of pre-processed character feature sets and the plurality of pre-processed audio tracks; controlling the display interface to resume the playback, and controlling the audio output interface to output the determined audio track.

According to one or more embodiment of a playback method of infrared remote control audiovisual device, the playback method of infrared remote control audiovisual device comprises: utilizing a display interface to display a plurality of frames of a video, and utilizing an audio output interface to output an audio signal of the video; utilizing an infrared sensor to receive a first indication signal; utilizing a processor to pause a playback of the display interface and an output of the audio output interface according to the first indication signal, so that the display interface displays a paused frame; utilizing the infrared sensor to receive a second indication signal; utilizing the processor to determine a target character pattern of a target block in the paused frame according to the second indication signal, wherein the second indication signal indicates the target block, and the target character pattern corresponds to one of the plurality of pre-processed character feature sets; utilizing the processor to extract a determined audio track corresponding to the target character pattern from the audio signal according to a relation between the plurality of pre-processed character feature sets and the plurality of pre-processed audio tracks; controlling the display interface to resume the playback and controlling the audio output interface to output the determined audio track.

With the foregoing configuration, the infrared remote control audiovisual device and the infrared remote control playback method thereof of the present disclosure determine the corresponding audio tracks of the character specified by the infrared indication signal, and may provide the function of playing the sound of the specific character alone.

The foregoing context of the present disclosure and the detailed description given herein below are used to demonstrate and explain the concept and the spirit of the present invention and provides the further explanation of the claim of the present invention.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
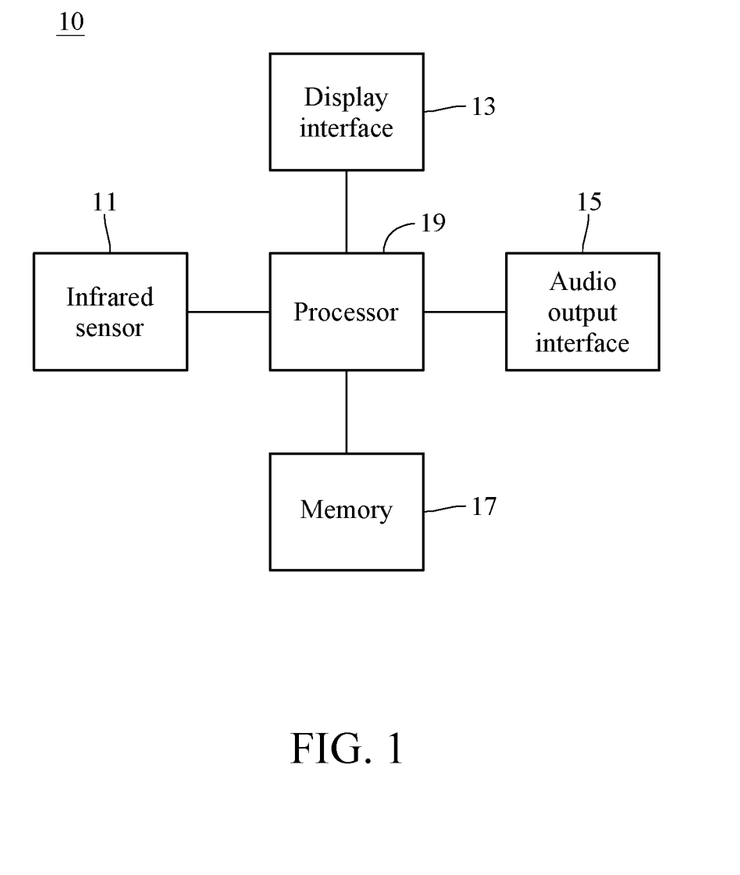
FIG. 1 is a block diagram of the infrared remote control audiovisual device according to one embodiment of the present invention.

Please refer to FIG. 1, which is a block diagram of the infrared remote control audiovisual device according to one embodiment of the present invention. As shown in FIG. 1, the infrared remote control audiovisual device 10 comprises the infrared sensor 11, the display interface 13, the audio output interface 15, the memory 17 and the processor 19, wherein the processor 19 is connected to the infrared sensor 11, the display interface 13, the audio output interface 15, the memory 17 via the wired connection or the wireless connection. Specially, the infrared remote control audiovisual device 10 may be the smart TV, but the present invention is not limited thereto.

The infrared sensor 11 is arranged to receive the infrared indication signal, such as the infrared indication signal emitted by the remote controller. Further, the infrared indication signal may have different codes according to different buttons triggered (e.g. by pressing) by the remote controller or the other codes distinguished by the processor 19. For example, the display interface 13 may be the screen, and the audio output interface 15 may be the speaker. The display interface 13 and the audio output interface 15 are arranged to play videos. Further, the display interface 13 is arranged to display a plurality of frames of a video, and the audio output interface 15 is arranged to output audio signals of the video.

For example, the memory 17 may be a flash memory, hard disk drive (HDD), solid-state disk (SSD), dynamic random access memory (DRAM), static random access memory (SRAM) or other type of non-volatile memories. The memory 17 may be a local storage or a remote storage such as the cloud database. The memory 17 stores the plurality of pre-processed character feature sets, the plurality of pre-processed audio tracks, and the relation between the plurality of pre-processed character feature sets and the plurality of pre-processed audio tracks, wherein the relation may be stored in the manner of look-up table.

For example, the processor 19 may be the central processing unit, the microcontroller, the PLC (programmable logic controller, PLC) or other type of processors. The processor 19 is arranged to process the video played via the display interface 13 and the audio output interface 15 based on the infrared indication signal received by the infrared sensor 11, to play the sound corresponding to specified characters. The further execution step would be described below.

Figure 2:
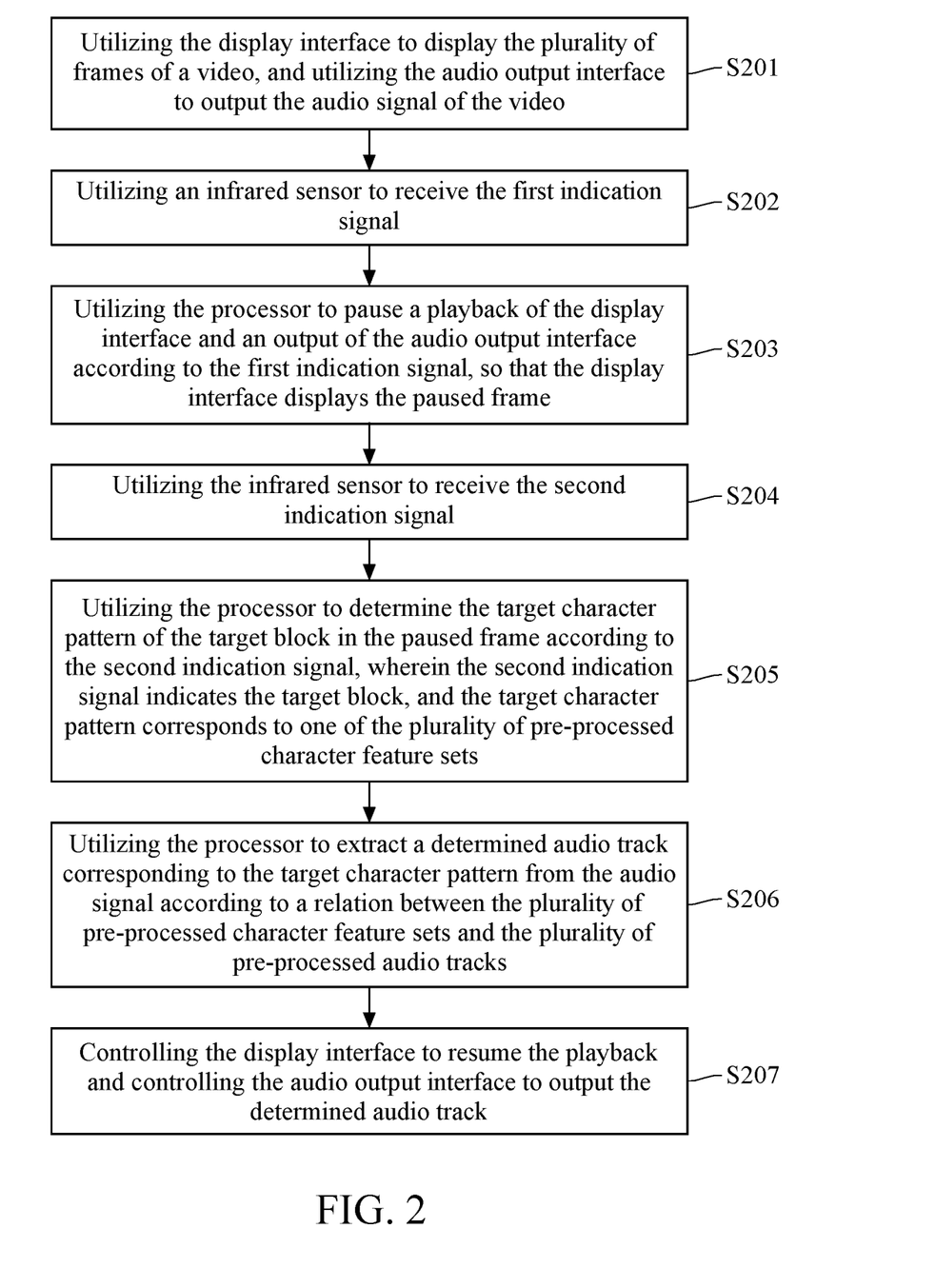
FIG. 2 is a flowchart of the playback method of the infrared remote control audiovisual device according to one embodiment of the present invention.

Please refer to FIG. 1 and FIG. 2, and FIG. 2 is a flowchart of the playback method of the infrared remote control audiovisual device according to one embodiment of the present invention. As shown in FIG. 2, the playback method of the infrared remote control audiovisual device may comprise steps S201-S207. The playback method of the infrared remote control audiovisual device shown in FIG. 2 may be performed by the infrared remote control audiovisual device 10 shown in FIG. 1, but the present invention is not limited thereto. For better understanding, operations of the infrared remote control audiovisual device is mentioned to illustrate the infrared remote control audio and video playback method.

In step S201, the infrared remote control audiovisual device 10 utilizes the display interface 13 to display the plurality of frames of the video, and utilizes the audio output interface 15 to output the audio signal of the video. In steps S202 and S203, the infrared remote control audiovisual device 10 utilizes the infrared sensor 11 to receive the first indication signal, and utilizes the processor 19 to pause the playback of the display interface 13 and the output of the audio output interface 15 according to the first indication signal, so that the display interface 13 displays the paused frame, i.e., pausing the video playback. Further, the first indication signal may be from the infrared remote controller, and the infrared remote controller has a plurality of buttons. When the specified button or the specified button set is triggered, the infrared remote controller outputs the first indication signal and the first indication signal is provided with the code representing specified buttons or a specified button set (referred to as the pause code hereinafter). For example, the specified button may be the zero button or the pause button, but the present invention is not limited thereto. The processor 19 pre-stores the relation between the pause code and the pausing process of the video playback. When the processor 19 receives the first indication signal, the processor 19 controls the display interface 13 and the audio output interface 15 to pause the video playback according to the first indication signal provided with the pause code.

In step S204, the infrared remote control audiovisual device 10 utilizes the infrared sensor 11 to receive the second indication signal. Here, it is needed to explain that the step S204 may be performed between the step S202 and step S203. For example, the user may utilize the infrared remote controller to emit two indication signals in succession. The processor 19 may determine the former one as the first indication signal and the latter one as the second indication signal according to the time order of receiving the two indication signals.

Afterwards, the infrared remote control audiovisual device 10 utilizes the processor 19 to execute steps S205 to S207. In step S205, the processor 19 determines the target character pattern in the target block of the paused frame according to the second indication signal, wherein the second indication signal indicates the target block, and the target character pattern corresponds to one of the plurality of pre-processed character feature sets. Further, the processor 19 divides the paused frame into the plurality of divided blocks and assigns each of the plurality of divided blocks with a specified code. The specified codes of divided blocks correspond to different buttons or different button sets on the infrared remote controller. The second indication signal generated by the infrared remote controller is provided with the corresponding specified code based on the triggered button or the triggered button set. When the processor 19 receives the second indication signal, the processor 19 may determine the divided block corresponding to the specified code in the second indication signal as the target block. Specially, the button or the button set corresponding to the specified code is different from the button or the button set corresponding to the foregoing pause code.

The processor 19 determines that there is a qualified target character pattern in the target block according to the plurality of pre-processed character feature sets stored in the memory 17. Further, each pre-processed character feature set comprises the plurality of features such as facial features and face shape features. When the processor 19 determines that the number of the features comprised in the target block is the same as the preset number of the features in the pre-processed character feature set, the processor 19 determines that there is the qualified target character pattern in the target block. Specially, when the processor 19 determines that there is not the pattern in the target block conforming to the pattern in the pre-processed character feature set, the processor 19 does not operate or the processor 19 utilizes the display interface 13 or the audio output interface 15 to output a request signal to request another second indication signal, and the flow goes to step S205 again after receiving this new second indication signal.

In step 206 of FIG. 2, the processor 19 extracts the determined audio track corresponding to the target character pattern from the audio signal according to the relation between the plurality of pre-processed character feature sets and the plurality of pre-processed audio tracks. Further, the plurality of pre-processed character feature sets respectively comprise facial features and face shape features of different characters in the video. The plurality of pre-processed audio tracks respectively comprise the sounds of different characters. The relation between the plurality of pre-processed character feature sets and the plurality of pre-processed audio tracks indicates the relevance between the pre-processed character feature set and the pre-processed audio tracks belonging to the same character. The pre-processed character feature set, the pre-processed audio track and the relation between both of them may be processed with the artificial intelligence (AI) technology by the processor or an exterior processor (e.g. the cloud server) before playing the video, and may be stored in the memory 17. The details of the AI processing method will be described later. In one embodiment, the pre-processed audio track is acquired by processing the partial audio signal of the video. The processor 19 may determine the pre-processed audio track corresponding to the target character pattern according to the relation between the plurality of pre-processed character feature sets and the plurality of pre-processed audio tracks and may extract the determined audio track with the same voiceprint from the audio signal according to the voiceprint of the pre-processed audio track. In another embodiment, the pre-processed audio track is acquired by processing the entire audio signal of the video. The processor 19 may determine the pre-processed audio track corresponding to the target character pattern according to the relation between the plurality of pre-processed character feature sets and the plurality of pre-processed audio tracks, and may use the pre-processed audio track as the determined audio track.

In step S207, the processor 19 controls the display interface 13 to resume the playback and controls the audio output interface 15 to output the determined audio track. In one embodiment, the processor 19 may control the audio output interface 15 to only output the determined audio track without outputting the other audio tracks in the audio signal. In another embodiment, the processor 19 may control the audio output interface 15 to output the determined audio track of which volume is higher than the other audio tracks.

Figure 3:
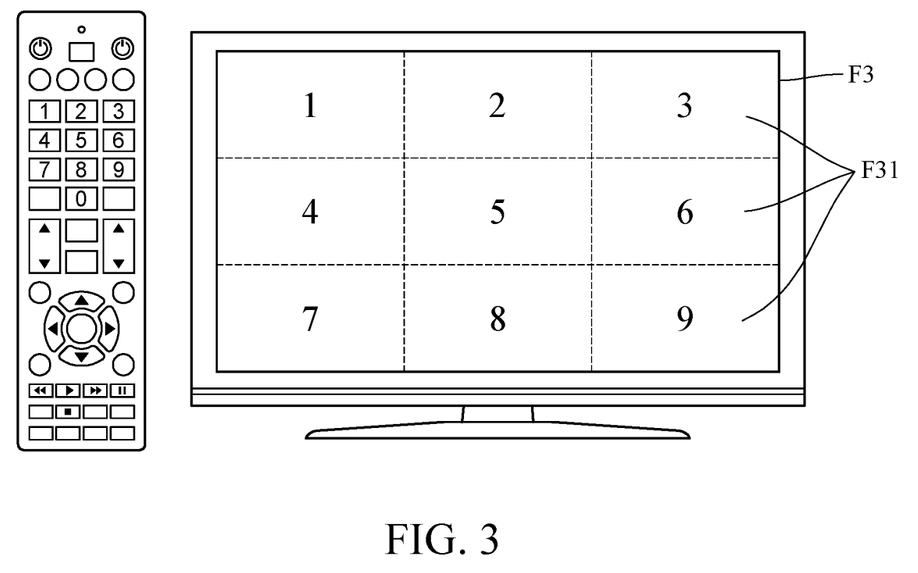
FIG. 3 is a using schematic diagram of the infrared remote control audiovisual device according to one embodiment of the present invention.
Figure 4:
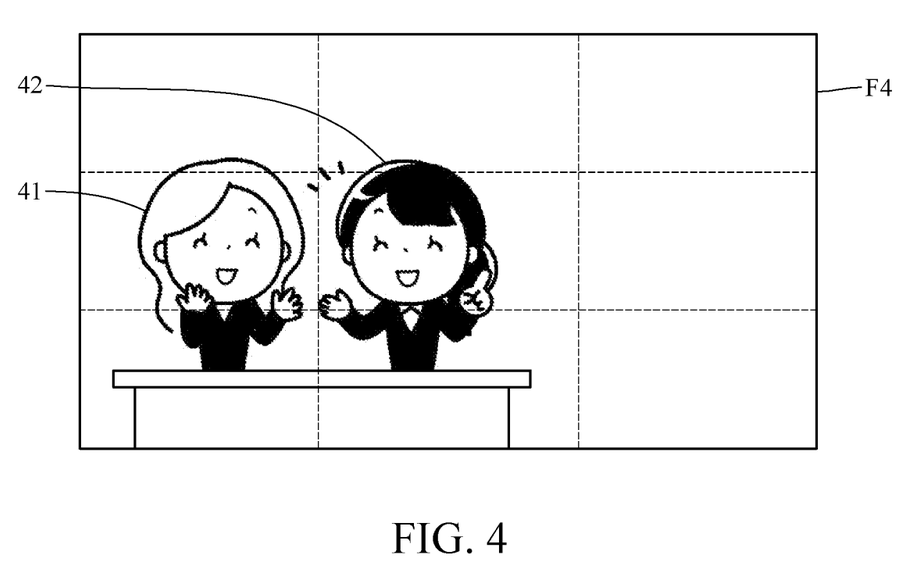
FIG. 4 is a paused frame schematic diagram of the infrared remote control audiovisual device according to one embodiment of the present invention.

Take an actual example to illustrate steps S205-S207. Please refer to FIG. 3 and FIG. 4. FIG. 3 is a schematic diagram of the infrared remote control audiovisual device according to one embodiment of the present invention, and FIG. 4 is a paused frame schematic diagram of the infrared remote control audiovisual device according to one embodiment of the present invention. As shown in FIG. 3, the paused frame F3 of the television (TV) screen may be divided into nine divided blocks F31 respectively assigned to specified codes 1-9, which correspond to the number button 1-9 on the infrared remote controller, respectively. When the number button 1 is triggered and the infrared remote controller emits the second indication signal to the TV, the processor of the TV may determine that the target block is the divided block F31 with the specified code 1, and so forth.

The paused frame F4 shown in the FIG. 4 is assumed to be provided with specified code configuration shown in FIG. 3. When the second indication signal indicates the specified code 4, the processor determines that there is the qualified target character pattern 41 in the target block according to the plurality of pre-processed character feature sets stored in the memory, and extracts the determined audio track corresponding to the target character pattern 41 from the audio signal according to the relation between the plurality of pre-processed character feature sets and the plurality of pre-processed audio tracks. The processor controls the display interface to resume the playback and controls the audio output interface to output the determined audio track. When the second indication signal indicates the specified code 5, as mentioned above, the processor determines the target character pattern 42 and extracts the determined audio track corresponding to the target character pattern 42 from the audio signal. The processor controls the display interface to resume the playback and controls the audio output interface to output the determined audio track. Specially, the dotted line of the divided paused frame F4 may be selectively displayed on the actual frame. For example, when controlling the display interface to pause, the processor may control the display interface to display the dotted line of the divided paused frame F4 to facilitate the user to select the target block.

FIG. 4 illustrates an embodiment as example in which there are single target character patterns 41 and 42 in the target block. In one embodiment, there are a plurality of target character patterns in the target block, the processor may extract the determined audio tracks corresponding to the target character patterns from the audio signal according to the relation between the plurality of pre-processed character feature sets and the plurality of pre-processed audio tracks, and the processor may control the display interface to resume the playback and control the audio output interface to output determined audio tracks.

Figure 5:
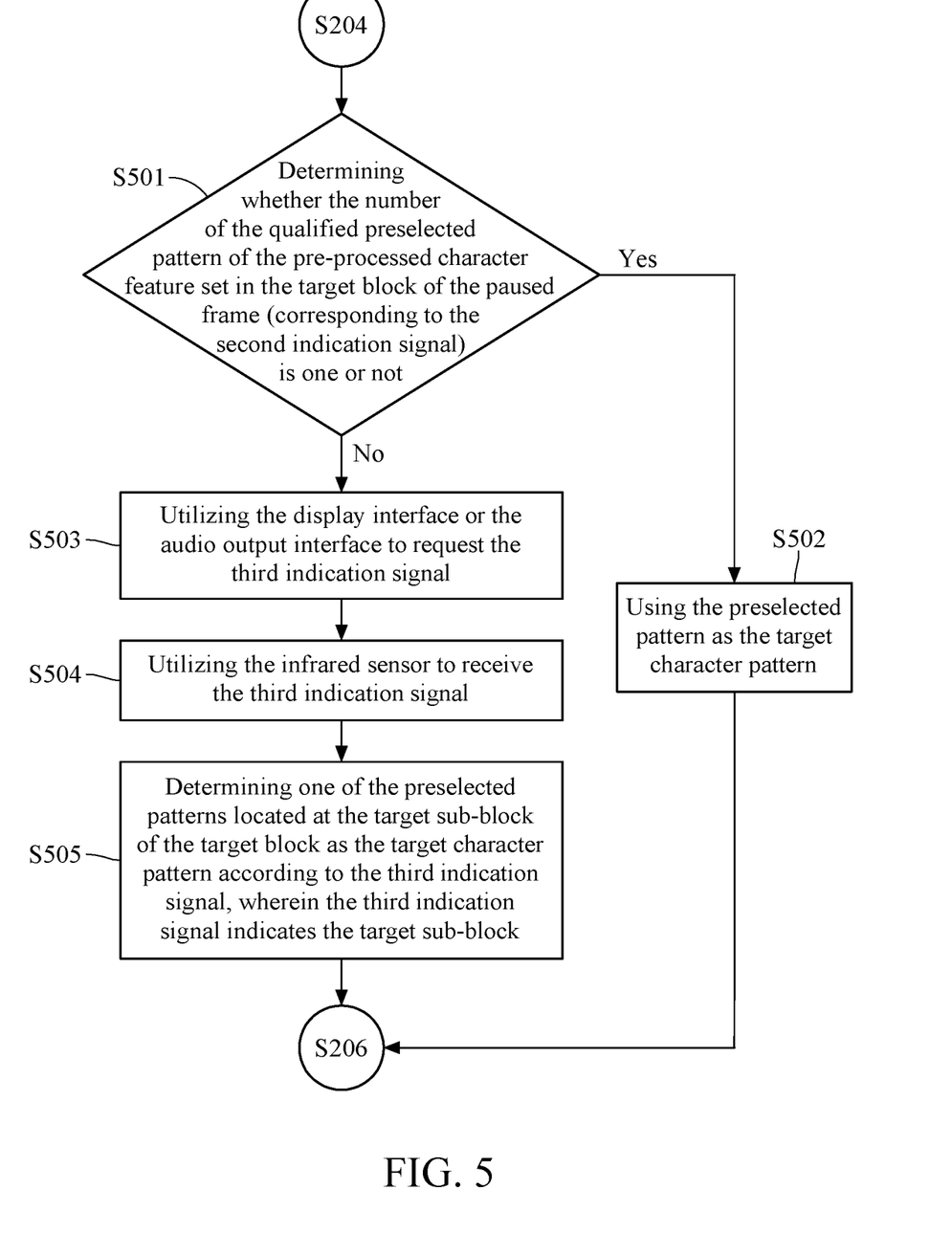
FIG. 5 is a flowchart of the playback method of the infrared remote control audiovisual device according to another embodiment of the present invention.

With regard to another embodiment of a plurality of target character patterns existing in the target block, please refer to FIG. 1, FIG. 2 and FIG. 5. FIG. 5 is a flowchart of the playback method of the infrared remote control audiovisual device according to another embodiment of the present invention. The playback method of the infrared remote control audiovisual device comprises the steps S201-S204, S206 and S207 illustrated by FIG. 2, but the difference between the FIG. 2 and FIG. 5 is that S205 comprises steps S501-S505. Similarly, steps S501-S505 may be executed by infrared remote control audiovisual device 10, but is not limited thereto. To understand easily, steps S501-S505 are illustrated as example with the operation of the infrared remote control audiovisual device 10.

In step S501, the processor 19 determines whether the number of the qualified preselected pattern of the pre-processed character feature set in the target block of the paused frame (corresponding to the second indication signal) is one or not. When the determination result is "Yes" as shown by step S502, the processor 19 uses the preselected pattern as the target character pattern and then performs step S206. When the determination result is "No" as shown by step S503, the processor 19 utilizes the display interface 13 and/or the audio output interface 15 to request the third indication signal. For example, the processor 19 may control the display interface 13 to enlarge the target block to fill the frame and/or display the message associated with requesting the third indication signal. For another example, the processor 19 may control the audio output interface 15 to output the voicemail about requesting the third indication signal.

In steps S504 and S505, the processor 19 utilizes the infrared sensor 11 to receive the third indication signal, and the processor 19 determines one of the preselected patterns located at a target sub-block of the target block as the target character pattern according to the third indication signal, wherein the third indication signal indicates the target sub-block. Further, the processor 19 divides the target block into a plurality of divided sub-blocks and assigns each of the plurality of divided sub-blocks to the specified code. Each specified code of the plurality of divided sub-blocks corresponds to different buttons or a different button set on the infrared remote controller. The third indication signal generated by the infrared remote controller is provided with the corresponding specified code based on the triggered button or the triggered button set. When the processor 19 receives the third indication signal, the processor 19 may determine the divided sub-block corresponding to the specified code in the third indication signal as the target sub-block. The processor 19 uses the preselected pattern in the target sub-block as the target character pattern and then performs step S206. Specially, when the processor 19 determines that there is no preselected pattern in the target sub-block, the processor 19 does not operate or the processor 19 utilizes the display interface 13 or the audio output interface 15 to output a request signal to request another third indication signal and performs step S505 again after receiving said other third indication signal.

Figure 6A:
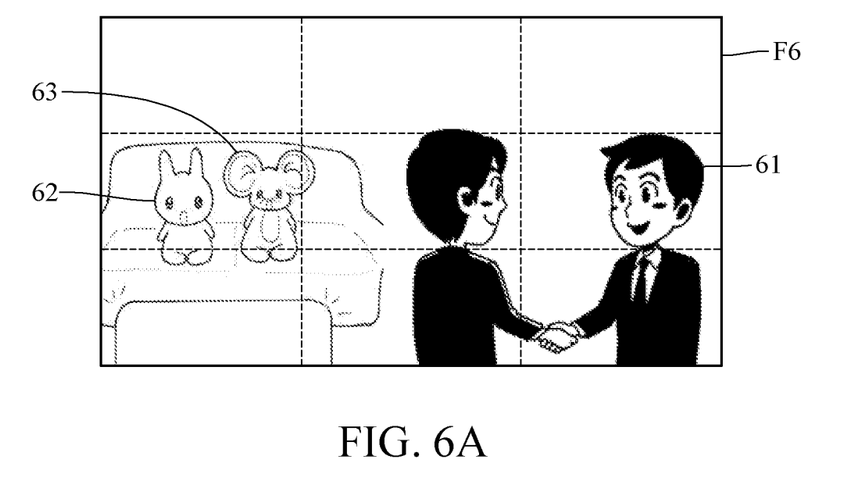
FIG. 6A and FIG. 6B are a paused frame schematic diagram of the infrared remote control audiovisual device according to another embodiment of the present invention.
Figure 6B:
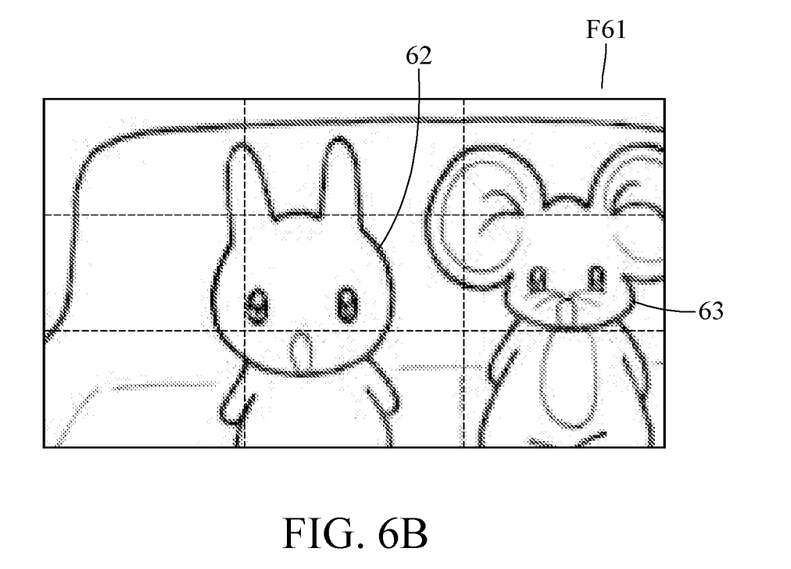

Take an actual example to illustrate steps S501-S505. Please refer FIG. 6A and FIG. 6B, which are the paused frame schematic diagrams of the infrared remote control audiovisual device according to another embodiment of the present invention. The paused frame F6 shown in the FIG. 6A is assumed to be provided with specified codes configuration shown in FIG. 3. When the second indication signal indicates the specified code 6, the processor determines that the number of the qualified preselected pattern 61 of the pre-processed character feature set in the target block of the paused frame (corresponding to the second indication signal) is one and uses the qualified preselected pattern 61 as the target character pattern. When the second indication signal indicates the specified code 4, the processor determines that the number of the qualified preselected pattern 62 and 63 of the pre-processed character feature set in the target block of the paused frame (corresponding to the second indication signal) is multiple and controls the display interface to enlarge the target block to fill the frame as shown in FIG. 6B. The target block F61 shown in the FIG. 6B is assumed to be provided with specified codes configuration shown in FIG. 3. When the third indication signal indicates the specified code 6, the processor determines the preselected pattern 63 as the target character pattern. When the third indication signal indicates the specified code 5, the processor determines the preselected pattern 62 as the target character pattern.

Specially, the dotted line of the divided paused frame F6/target block F61 as shown in FIG. 6A/6B may be selectively displayed on the actual frame. For example, when controlling the display interface to pause the playback, the processor may control the display interface to display the dotted line of the divided paused frame F6 to facilitate the user in selecting the target block, and/or may control the display interface to enlarge the target block F61 and control the display interface to display the dotted line of the target block F61 to facilitate the user in selecting the target sub-block.

Figure 7:
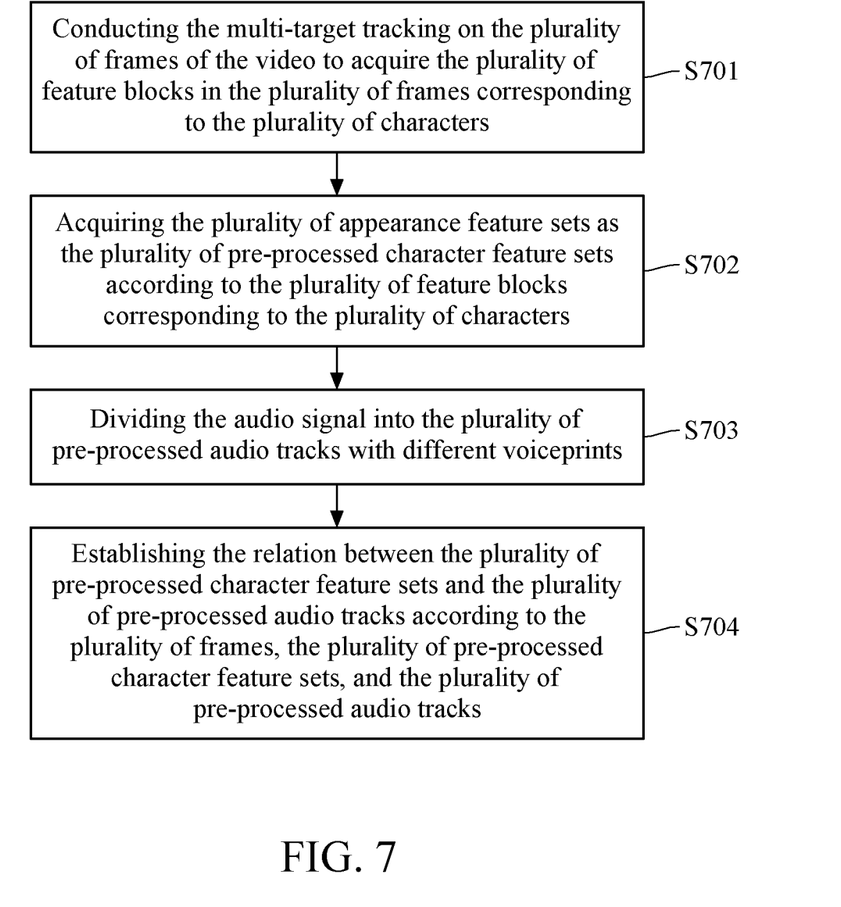
FIG. 7 is a pre-processing flowchart of the playback method of the infrared remote control audiovisual device according to one embodiment of the present invention.

As the foregoing description, he pre-processed character feature set, the pre-processed audio track and the relation between both of them may be processed to acquire by the processor or the exterior processor (e.g. the cloud server) before playing the video or during the period of playing the video before the processor receives the first indication signal. The foregoing data processing refers to FIG. 7, which is a pre-processing flowchart of the playback method of the infrared remote control audiovisual device according to one embodiment of the present invention. As shown in FIG. 7, the pre-processing of the playback method of the infrared remote control audiovisual device is associated with the AI technology, and may comprise steps S701-S704.

In step S701, the processor conducts multi-target tracking on the plurality of frames of the video to acquire the plurality of feature blocks in the plurality of frames corresponding to the plurality of characters. The plurality of frames may be the entire frames of the video, or the displayed frames before the processor receives the first indication signal. Further, the multi-target tracking conducted by the processor may comprise: Adjusting the frame; Inputting the adjusted frame to the pre-trained object detection model (such as Yolov3 or the other detection model with regard to detecting character) to generate a plurality of bounding boxes; Inputting the plurality of bounding boxes to the tracker to obtain the results of the plurality of characters, which are the feature block of each character in each frame, wherein the tracker conducts the multi-target tracking algorithm on the inputted data, such as the Simple Online and Real-time Tracking (SORT) algorithm.

In step S702, the processor acquires the plurality of appearance feature sets as the plurality of pre-processed character feature sets according to the plurality of feature blocks corresponding to the plurality of characters. Further, for each character, the processor obtains the appearance features such as the facial features and the face shape features based on the tracking results and combines them to form the plurality of appearance feature sets as the plurality of pre-processed character feature sets.

In step S703, the processor divides the audio signal into the plurality of pre-processed audio tracks with different voiceprints. Further, the processor utilizes the trained sound source separation model to divide the audio signal into the plurality of pre-processed audio tracks with different voiceprints. The sound source separation model may be the model trained by the AI intelligent neural network speech recognition algorithm, e.g., the AI intelligent neural network speech recognition algorithm may be SORT. It should be noted that the processor may conduct pre-processing on the frames and the pre-processing on the audio signal of the frames simultaneously or separately. In addition to conducting the step S703 after step S702, as shown in FIG. 7, the step S703 may be conducted before step S701, or may be conducted between step S701 and step S702, or may conducted with step S701 and step S702 at the same time.

In step S704, the processor establishes the relation between the plurality of pre-processed character feature sets and the plurality of pre-processed audio tracks according to the plurality of frames, the plurality of pre-processed character feature sets, and the plurality of pre-processed audio tracks. Further, by taking each of the pre-processed audio tracks as a target audio track, the step S704 may comprise following steps: (1) executing a face motion detection on the plurality of feature blocks in the plurality of target frames among the plurality of frames that correspond to a period when the target audio track has a signal. (2) determining that the target audio track corresponds to one of the plurality of pre-processed character feature sets according to the result of the face motion detection. In brief, the processor may determine the character whose mouth is opening or shutting in the frames when the target audio track has a signal and establishes the relation between the pre-processed character feature set and the pre-processed audio track. Specially, the processor could pre-determine the target audio track as having a signal, and then conduct determination on the characters whose mouth is open and close in the frames, in order to prevent the situation where the sound and the motion of the character whose mouth is opening and shutting in the frames do not match when the target audio track has a signal, and to prevent the problem of the delay phenomenon of the motions of the characters.

With the foregoing architecture, the infrared remote control audiovisual device and playback method thereof disclosed by the present disclosure determine the corresponding audio track of the character assigned by the infrared indication signal based on the relation between the plurality of pre-processed character feature sets and the plurality of pre-processed audio tracks and may provide the function of playing the sound of specified character alone.

Although embodiments of the present invention are disclosed as the above, it is not meant to limit the scope of the present invention. Any possible modifications and variations based on the embodiments of the present inventions shall fall within the claimed scope of the present invention. The claimed scope of the present invention is defined by the claim as follows.

What is claimed is:

1. An infrared remote control audiovisual device comprising:
   an infrared sensor, arranged to receive a first indication signal and a second indication signal;
   a display interface, arranged to display a plurality of frames of a video;
   an audio output interface, arranged to output an audio signal of the video;
   a memory storing a plurality of pre-processed character feature sets, a plurality of pre-processed audio tracks, and a relation between the plurality of pre-processed character feature sets and the plurality of pre-processed audio tracks; and
   a processor connected to the infrared sensor, the display interface, the audio output interface and the memory, and arranged to perform following steps:
   pausing a playback of the display interface and an output of the audio output interface according to the first indication signal, so that the display interface displays a paused frame;
   determining a target character pattern of a target block in the paused frame according to the second indication signal, wherein the second indication signal indicates the target block, and the target character pattern corresponds to one of the plurality of pre-processed character feature sets;
   extracting a determined audio track corresponding to the target character pattern from the audio signal according to the relation between the plurality of pre-processed character feature sets and the plurality of pre- processed audio tracks; and controlling the display interface to resume the playback,
   controlling the audio output interface to output the determined audio track;
   conducting a multi-target tracking on the plurality of frames to acquire a plurality of feature blocks in the plurality of frames corresponding to a plurality of characters;
   acquiring a plurality of appearance feature sets as the plurality of pre-processed character feature sets according to the plurality of feature blocks corresponding to the plurality of characters;
   dividing the audio signal into the plurality of pre-processed audio tracks with different voiceprints; and
   establishing the relation between the plurality of pre-processed character feature sets and the plurality of pre-processed audio tracks according to the plurality of frames, the plurality of pre-processed character feature sets, and the plurality of pre-processed audio tracks.

2. The infrared remote control audiovisual device according to claim 1, wherein the step of establishing the relation between the plurality of pre-processed character feature sets and the plurality of pre-processed audio tracks according to the plurality of frames, the plurality of pre-processed character feature sets, and the plurality of pre-processed audio tracks further comprises:
   executing, by taking each of the pre-processed audio tracks as a target audio track, following steps:
   executing a face motion detection on the plurality of feature blocks in a plurality of target frames among the plurality of frames that correspond to a period when the target audio track has a signal; and
   determining that the target audio track corresponds to one of the plurality of pre-processed character feature sets according to a result of the face motion detection.

3. The infrared remote control audiovisual device according to claim 1, wherein when the processor determines that there are a plurality of selected patterns corresponding to the plurality of pre-processed character feature sets in the target block of the paused frame, the processor requests a third indication signal from the display interface or the audio output interface, and obtains the third indication signal from the infrared sensor, and the processor determines one of preselected patterns located at a target sub-block of the target block as the target character pattern according to the third indication signal; wherein the third indication signal indicates the target sub-block.

4. The infrared remote control audiovisual device according to claim 1, wherein the processor divides the paused frame into a plurality of divided blocks and assigns each of the plurality of divided blocks to a specified code; wherein the target block is one of the plurality of divided blocks and the second indication signal indicates the specified code to correspond to the of the target block.

5. A playback method of infrared remote control audiovisual device comprising:
   utilizing a display interface to display a plurality of frames of a video, and
   utilizing an audio output interface to output an audio signal of the video;
   utilizing an infrared sensor to receive a first indication signal; utilizing a processor to pause a playback of the display interface and an output of the audio output interface according to the first indication signal, so that the display interface displays a paused frame;
   utilizing the infrared sensor to receive a second indication signal;
   utilizing the processor to determine a target character pattern of a target block in the paused frame according to the second indication signal, wherein the second indication signal indicates the target block, and the target character pattern corresponds to one of a plurality of pre-processed character feature sets;
   utilizing the processor to extract a determined audio track corresponding to the target character pattern from the audio signal according to a relation between the plurality of pre-processed character feature sets and a plurality of pre-processed audio tracks;

controlling the display interface to resume the playback and controlling the audio output interface to output the determined audio track;

conducting a multi-target tracking on the plurality of frames to acquire a plurality of feature blocks in the plurality of frames corresponding to a plurality of characters;

acquiring a plurality of appearance feature sets as the plurality of pre-processed character feature sets according to the plurality of feature blocks corresponding to the plurality of characters;

dividing the audio signal into the plurality of pre-processed audio tracks with different voiceprints; and establishing the relation between the plurality of pre-processed character feature sets and the plurality of pre-processed audio tracks according to the plurality of frames, the plurality of pre-processed character feature sets, and the plurality of pre-processed audio tracks.

6. The playback method of infrared remote control audio-visual device according to claim 5, wherein the step of establishing the relation between the plurality of pre-processed character feature sets and the plurality of pre-processed audio tracks based on the plurality of frames, the plurality of pre-processed character feature sets and the plurality of pre-processed audio tracks further comprises:

executing, by taking each of the pre-processed audio tracks as a target audio track, following steps:

executing a face motion detection on the plurality of feature blocks in a plurality of target frames among the plurality of frames that correspond to a period when the target audio track has a signal; and determining that the target audio track corresponds to one of the plurality of pre-processed character feature sets according to a result of the face motion detection.

7. The playback method of infrared remote control audio-visual device according to claim 5, wherein the step of determining the target character pattern of the target block in the paused frame according to the second indication signal comprises:

requesting a third indication signal from the display interface or the audio output interface when the processor determines that there are a plurality of selected patterns corresponding to the plurality of pre-processed character feature sets in the target block of the paused frame;

obtaining the third indication signal from the infrared sensor; and determining one of preselected patterns located at a target sub-block of the target block as the target character pattern according to the third indication signal;

wherein the third indication signal indicates the target sub-block.

8. The playback method of infrared remote control audio-visual device according to claim 5, further comprising:

dividing the paused frame into a plurality of divided blocks and assigning each of the plurality of divided blocks to a specified code; and wherein the target block is one of the plurality of divided blocks and the second indication signal indicates the specified code to correspond to the of the target block.

* * * * *

UNITED STATES PATENT AND TRADEMARK OFFICE
CERTIFICATE OF CORRECTION

PATENT NO. : 11,405,675 B1
APPLICATION NO. : 17/548711
DATED : August 2, 2022
INVENTOR(S) : Ting et al.

Page 1 of 1

It is certified that error appears in the above-identified patent and that said Letters Patent is hereby corrected as shown below:

On the Title Page

Item (12) "Ting" should read -- Ting et al. --.

Item (72) Inventor is corrected to read:
-- Kuo-Chi Ting, Taipei (TW);
Po Hsuan Huang, 66, Hou-Kang Street, Shih-Lin Dist., Taipei (TW);
Hao-Sheng Wang, 66 Huo-Kang Street, Shih-Lin Dist., Taipei (TW) --.

Signed and Sealed this
Twenty-sixth Day of November, 2024

Katherine Kelly Vidal
*Director of the United States Patent and Trademark Office*